(12) United States Patent
Melody et al.

(10) Patent No.: US 6,436,268 B1
(45) Date of Patent: Aug. 20, 2002

(54) NON-AQUEOUS ELECTROLYTES FOR ANODIZING

(75) Inventors: Brian John Melody; John Tony Kinard, both of Greer; David Alexander Wheeler, Williamston; Philip Michael Lessner, Simpsonville, all of SC (US)

(73) Assignee: Kemet Electronics Corporation, Greenville, SC (US)

( * ) Notice: Subject to any disclaimer, the term of this patent is extended or adjusted under 35 U.S.C. 154(b) by 77 days.

(21) Appl. No.: 09/630,605

(22) Filed: Aug. 2, 2000

(51) Int. Cl.⁷ ............................................... C25D 11/02
(52) U.S. Cl. ........................ 205/234; 205/322; 205/332
(58) Field of Search ................................. 205/234, 322, 205/332

(56) References Cited

U.S. PATENT DOCUMENTS

| | | | |
|---|---|---|---|
| 3,180,809 A | 4/1965 | Gregori | |
| 3,359,191 A | 12/1967 | Minami et al. | |
| 3,496,424 A | 2/1970 | Behrend | |
| 3,563,863 A | 2/1971 | Vierow | |
| 3,796,644 A | 3/1974 | Bernard | |
| 3,943,041 A | 3/1976 | Jackson | |
| 4,196,060 A | 4/1980 | Patrie et al. | |
| 4,383,897 A | 5/1983 | Gillich et al. | |
| 4,388,156 A | 6/1983 | Gillich et al. | |
| 4,476,517 A | 10/1984 | Fresia | |
| 4,479,166 A | 10/1984 | Finkelstein et al. | |
| 4,781,802 A | 11/1988 | Fresia | |
| 4,823,236 A | 4/1989 | Fresia | |
| 5,111,365 A | 5/1992 | Dapo | |
| 5,185,075 A | * 2/1993 | Rosenberg et al. | ......... 205/234 |
| 5,211,741 A | 5/1993 | Fife | |
| 5,385,662 A | 1/1995 | Kurze et al. | |
| 5,560,761 A | 10/1996 | Naito | |
| 5,580,367 A | 12/1996 | Fife | |
| 5,587,871 A | 12/1996 | Ue et al. | |
| 5,605,561 A | 2/1997 | Iwabuchi et al. | |
| 5,670,741 A | * 9/1997 | Stromquist et al. | ...... 149/109.6 |
| 5,687,057 A | 11/1997 | Dapo | |
| 5,716,511 A | 2/1998 | Melody et al. | |
| 6,051,044 A | 4/2000 | Fife | |

FOREIGN PATENT DOCUMENTS

| | | |
|---|---|---|
| EP | 0569121 | 11/1993 |
| GB | 537474 | 6/1941 |
| GB | 2168383 | 6/1986 |
| WO | WO98/19811 | 5/1998 |

OTHER PUBLICATIONS

Jackson N.F. et al., Institute of Electrical Engineers Stevenage, GB, "The use of niobium as an anode material in liquid filled electrolytic capacitors", Database accession No. 733083 XP002144913 Abstract & Electrocomponent Science and Technology, Sep. 1974, UK vol. 1, No. 1, pp. 27–37.

Patent Abstracts of Japan, vol. 10, No. 373, Abs Grp No.: C391, Abstracting Appln. No. 60–8438, Dec. 1986.

Melody et al., An Improved Series of Electrolytes For Use In The Anodization of Tantalum Capacitor Anodes, Presented at the Capacitor and Resistor Technology Symposium (C.A.R.T.X. '92), Mar. 17, 1992, pp. 1–11.

* cited by examiner

Primary Examiner—Nam Nguyen
Assistant Examiner—William T. Leader
(74) Attorney, Agent, or Firm—Banner & Witcoff, Ltd.

(57) ABSTRACT

Non-aqueous electrolytic solutions suitable for anodizing valve metal derivative anodes, methods of anodizing using non-aqueous electrolytic solutions, and capacitors prepared with non-aqueous electrolytic solutions. The non-aqueous electrolytic solution comprises glycerine and at least one soluble salt formed by the neutralization of at least one non-halogen-containing organic or inorganic acid anion with at least one alkali metal, ammonium, or protonated amine cation; wherein the acid anion is derived from an acid having a pKa lower than phosphoric acid.

7 Claims, No Drawings

NON-AQUEOUS ELECTROLYTES FOR ANODIZING

FIELD OF THE INVENTION

The present invention is directed to non-aqueous electrolytic solutions suitable for anodizing valve metal derivative anodes, to methods of anodizing using non-aqueous electrolytic solutions, and to capacitors prepared with non-aqueous electrolytic solutions.

BACKGROUND OF THE INVENTION

For many years, so-called solid tantalum capacitors have set the market standard for high capacitance per unit volume combined with high reliability. Since their introduction in the 1950's, solid tantalum capacitors have continued to shrink in size due to the introduction of tantalum powders having higher surface area per unit weight (i.e., smaller particle size). High surface area tantalum powders facilitate the use of smaller anodes having the same capacitance when anodized to equivalent anodic oxide thickness compared with older tantalum powders.

The utility of tantalum capacitors has been extended by the widespread introduction of surface mount solid tantalum capacitors in the 1980's. The heat-resistance properties inherent to solid tantalum capacitors due to the manganese dioxide counter electrode material used in the fabrication renders tantalum capacitors relatively immune to the destructive effects of heating during reflow-soldering compared with aluminum electrolytic capacitors which contain a liquid, organic-solvent-based electrolyte. Consequently, a large fraction of the applications which formerly utilized miniature aluminum electrolytic capacitors have been converted to solid tantalum capacitors of the surface mount configuration.

Further extending the utility of solid tantalum capacitors has been the introduction of inherently conductive polymers as counter electrode materials in place of the manganese dioxide traditionally present in these devices. The high electrical conductivity of inherently conductive polymers gives rise to a significant reduction in equivalent series resistance and loss of capacitance at higher frequencies in solid tantalum capacitors containing them. Solid tantalum capacitors with conductive polymer cathodes have the additional advantage of being resistant to ignition in the event of a short circuit occurring within the capacitor.

The recent introduction of surface mount, solid tantalum capacitors having multiple anode elements in parallel to reduce the equivalent series resistance of the devices to well under 10 milliohms further extends the use of solid tantalum capacitors to applications where previously only ceramic or metallized film capacitors could be used. The tantalum capacitors are generally much smaller than the ceramic or metallized film capacitors which they replace.

The improvements in tantalum capacitors, described above, combined with the explosive growth in the computer and mobile telephone industries have resulted in the growth in worldwide demand for tantalum capacitors from a few million pieces per year in the 1950's to well over a billion pieces per month today. In spite of the improvements in surface area per unit weight made by the suppliers of tantalum capacitor powder over the years, the demand for tantalum for capacitor purposes has grown steadily since the 1950's. Tantalum is a relatively rare element in nature, and this fact coupled with increasing demand, has resulted in a forty-fold or more increase in the price of tantalum powder over the past forty to fifty years.

It is widely recognized that the growth of the electronics industry is driven by greater device performance at lower cost, as time advances. Thus, while the capacitance per unit volume continues to increase, the price per unit of capacitance for solid tantalum capacitors continues to decrease with time, as it must in order for these devices to conform to the so-called learning curve of device manufacturing cost versus the logarithm of the cumulative number of devices sold worldwide. This learning curve of the cost requirements for components must be satisfied in order to maintain the growth rate of the electronics industry.

It is widely recognized that, in spite of the device manufacturing cost learning curve, surface area per unit weight of tantalum cannot be increased indefinitely. It is also recognized that the increasing demand for tantalum is forcing tantalum producers to process lower quality ores in order to meet demand for the metal. The extraction cost per pound of tantalum increases significantly with decreasing ore quality.

In an effort to reduce the cost of the valve metal component of solid capacitors, other valve metals in addition to tantalum have been tested for use in solid capacitor manufacture. The metal, niobium, is most closely related to tantalum in chemical and physical properties. For many years, attempts have been made to fabricate successful solid capacitors from niobium powder. Early niobium powders contained a relatively large amount of impurities and gave rise to highly flawed oxide during anodization at the temperatures normally used to anodize tantalum anodes (i.e., 80° C. to 90° C.) in dilute phosphoric acid. It was found that the production of blister-like flaws in the anodic oxide on niobium could be minimized through the use of anodizing temperatures below about 25° C. Unfortunately, solid niobium capacitors were found to give increasing leakage current and shorted devices upon testing under voltage at elevated temperatures (e.g., 85° C.).

Niobium powders prepared recently appear much improved with respect to impurity content and may be anodized at traditional anodizing temperatures (i.e., 80° C. to 90° C.) with the production of relatively flaw-free oxide at low anodizing voltages (60 volts or less). Particularly good dielectric properties, as indicated by wet-cell testing of anodized niobium anodes, are obtained through the use of the electrolytes and methods described in co-pending applications, Ser. No. 09/143,373 and Ser. No. 09/489,471.

Unfortunately, even solid capacitors manufactured from relatively pure niobium powder are subject to increasing leakage current and short circuit failures on life test at elevated temperature. The failures have been traced to the migration of oxygen from the anodic oxide into the niobium substrate. This failure mechanism is also known in tantalum capacitors, but the effect is much more pronounced with niobium.

Fortunately, a solution to the problem of oxygen migration from the anodic film to the valve metal substrate has been found and has been demonstrated for tantalum and niobium. On Mar. 9, 2000, at the 20th Capacitor And Resistor Technology Symposium, Dr. Terrance Tripp presented a paper, entitled: "Tantalum Nitride: A New Substrate for Solid Capacitors" (Authors: T. Tripp, R. Creasi, B. Cox; reprinted in the symposium proceedings, on pages 256–262). This paper describes the anodic oxide-to-valve metal substrate thermally-driven oxygen migration problem for the tantalum-tantalum oxide system. The authors also describe a method of overcoming this problem via the substitution of tantalum nitride or sub-nitride for tantalum powder in the fabrication of device anodes (the tantalum nitride, TaN, actually loses half of its nitrogen content during the vacuum sintering step used to consolidate the powder into an anode body, becoming tantalum sub-nitride, $Ta_2N$, by the end of the sintering process).

The presence of nitrogen in the tantalum sub-nitride substrate material does not appear to interfere with the formation of the anodic oxide film dielectric. Anodes prepared by vacuum sintering tantalum nitride or sub-nitride may be anodized in the electrolytes traditionally used in the tantalum capacitor industry as well as the electrolytes described in co-pending applications, Ser. No.09/143,373 , abondoned, and Ser. No.09/489,471 now U.S. Pat. No. 6,162,345, as well as PCT No. WO 00/12783. The anodic oxide films produced on sintered tantalum nitride or sub-nitride have proven to be greatly improved with respect to resistance to thermally driven oxygen migration, oxide-to-substrate, compared with anodic oxide films grown upon tantalum metal. This enhanced thermal stability toward oxygen migration is clearly demonstrated in the capacitance versus voltage bias curves for anodized and heat-treated tantalum and tantalum nitride substrates, depicted in FIG. 6 of the paper by Tripp, et. al.

Tripp, et. al., have extended their treatment of valve metals to niobium and have reported the same fundamental increase in resistance to oxygen migration for anodic oxide films on niobium nitride/sub-nitride compared with anodic films on niobium metal anodes as they observe for anodic films on tantalum/sub-nitride compared to anodic films on tantalum metal anodes. FIG. 9 of their C.A.R.T.S. paper (page 261 of the symposium proceedings) depicts the capacitance versus bias voltage for heat-treated anodic oxide films on niobium and on niobium nitride substrates. The improvement in stability for the anodic film on the niobium nitride is marked.

Fife, U.S. Pat. No. 6,051,044, discloses that at least some improvement in thermal stability of the niobium/niobium oxide system is realized by the presence of nitrogen in the niobium substrate at levels considerably below those present in the nitride or sub-nitride. Fife specifies as low as 300 ppm nitrogen and, more particularly, 300 ppm to 5000 ppm nitrogen (claim 4) constitutes an improvement over prior art niobium capacitor powders.

The mechanism by which the presence of nitrogen in the valve metal substrate gives rise to greater thermal stability of the anodic oxide/valve metal substrate with respect to oxygen diffusion into the substrate appears to be twofold. Nitrogen present at relatively low concentrations appears to act as a diffusion barrier, increasing the temperature and/or time required for degradation of the electrical leakage properties of the anodic oxide in a manner similar to the stability enhancement observed with tantalum anodes anodized in electrolyte solutions containing a relatively high concentration of orthophosphate ion, e.g., 1 to 5 wt. % or more orthophosphate.

The second mechanism through which the presence of nitrogen in the niobium or tantalum substrate gives rise to greater thermal stability of the anodic oxide/valve metal interface with respect to oxygen diffusion, particularly when the nitrogen is present in relatively large quantities, is the lowering of the chemical potential of the oxygen diffusion process (i.e., reducing the free energy liberated by the diffusion process) through the formation of relatively stable compounds of nitrogen and the valve metal substrate. Metal nitrides and sub-nitrides have a sufficiently high activation energy for decomposition that the temperatures employed for life-testing are many hundreds of degrees centigrade below those required for valve metal nitride decomposition.

The effectiveness of reducing the chemical potential driving oxygen diffusion (as opposed to employing an oxygen diffusion inhibitor) is illustrated in PCT No. WO 00/15555. This patent describes the use of a class of niobium suboxide, approximating NbO, in place of niobium for the fabrication of powder metallurgy capacitor anodes. The use of niobium suboxides as capacitor materials is said to result, not only in the production of anodes having greater resistance to surface area loss during sintering, hence greater capacitance retention, but also anodes which demonstrate a low level of electrical leakage current, presumably due to the inhibition of oxygen migration due to the reduction in chemical potential for the anodic oxide/niobium suboxide system versus the anodic oxide/niobium metal system.

Although the substitution of niobium for tantalum provides for a large potential reduction in material cost due to the more plentiful supply of niobium in nature (approximately 10 to 20 times more plentiful than tantalum), the lower density of niobium (8.57 gm/cc), compared with tantalum (16.6 gm/cc), and an extremely large deposit at a site in Brazil, there exist other materials which offer the possibility for even greater savings than niobium.

For many years it has been recognized that titanium forms an oxide having a very high dielectric constant (approximately 85) compared with tantalum oxide (approximately 26) and niobium oxide (approximately 41). Titanium has a relatively low density (4.54 gm/cc) and is very common in nature, being the 9th most common element in the earth's crust.

The production of adherent, relatively flaw-free and electrically insulating films on titanium is quite difficult due to the sensitivity of the material to anodizing electrolyte temperature, water content, proticity, as well as chloride contamination of both electrolyte and substrate metal. A process for successfully anodizing titanium and its alloys was developed in the early 1980's and is described by Melody in British Patent Application No. GB 2168383A. The method of this patent application is also described by Rosenberg, et. al., in the paper entitled: "Anodizing Mechanism in High Purity Titanium" (presented at the "Titanium '92," 7th International Conference on Titanium, San Diego, Calif., 1992).

Unfortunately, although high quality dielectric films can readily be grown on titanium anodes using the methods of British Pat. Application No. GB 2168383A, it has been found that anodic oxide films on titanium are subject to oxygen diffusion from the anodic oxide into the metal substrate even at room temperature. The solid solubility of oxygen in titanium is very large (almost 25 wt. %) as are the free energies of formation for the titanium suboxides. Thus titanium solid capacitor anodes are even more sensitive to thermal degradation than niobium solid capacitor anodes.

In much the same manner as niobium, titanium forms a nitride, TiN, and a series of suboxides. These materials possess high electrical conductivity and relative chemical inertness. While it is apparent that anodes fabricated from titanium nitride or suboxides should give rise to much more thermally stable anodic oxide films for the same reasons found with tantalum or niobium, unfortunately these materials give rise to oxygen evolution when biased positive in aqueous solutions and do not give rise to barrier-type anodic oxide films (or do so with such extremely low efficiencies that, for all practical purposes, they remain anodic oxide film-free).

In order to test this type of material, anode compacts were pressed from titanium nitride powder obtained from the GFS Chemical Company. These anode compacts were pressed to close to the theoretical density for the material in order to minimize current flow to any internal surfaces of the sintered anodes in order to facilitate study of current flow through the relatively small surface area represented by the envelope surrounding the anode bodies. The anode compacts were equipped with embedded tantalum wires for electrical contacts. The tantalum nitride anode compacts were then sintered at 1,600° C. for 20 minutes to produce consolidated titanium nitride anode bodies at near the theoretical density for the material.

It is noted that for capacitor production purposes, powder metallurgy valve metal anode compacts are generally produced at ⅓ to ⅔ of the theoretical density of the valve metal in order to make use of the large internal surface area of the anodes. The titanium nitride anode bodies, described above, were prepared for testing purposes only in order to study the anodizing behavior of the consolidated material, as one would study the behavior of foil coupons, without the complication of phenomena, such as gas evolution, arising from the reactions within the fine pores of traditional porous anodes.

The anodic film-forming properties of the full-density titanium nitride anodes were then determined in dilute phosphoric acid by suspending an anode in a stainless steel beaker of 0.1% phosphoric acid at 85° C. and applied d.c. voltage with the anode biased positive. As soon as the hydrogen reduction potential was reached, hydrogen was evolved at the stainless steel beaker and oxygen at the anode surface. There was no sign of anodic film formation, and increasing the applied voltage was found to increase the current; the current did not decay with time as is the case during anodic oxide film growth.

The gassing and lack of anodic film formation in this experiment are similar to (but even more pronounced than) the results obtained by anodizing titanium anodes in hot, dilute acids. In light of the successful results obtained anodizing titanium by employing the electrolytes and methods described in British Pat. Application No. GB 2168383A, a full-density titanium nitride anode was immersed in a 25° C., 10 vol. % solution of 85% phosphoric acid in N-methyl-2-pyrrolidone (one preferred embodiment of GB 2168383A) contained in a stainless steel beaker. It was found that the titanium nitride anode could be readily anodized to well over 100 volts at a constant current of approximately 5 milliamperes per square centimeter. An additional titanium nitride anode body (full density) was anodized to 100 volts, again at approximately 5 milliamperes per square centimeter. Upon reaching 100 volts, the current decayed with time to a value less than 1% of the initial value, as is the case with tantalum, aluminum and other valve metal materials used to fabricate electrolytic capacitors. Thus the ability to anodize derivatives of valve metals which have been found to be difficult or impossible to anodize in aqueous electrolytes, such as the nitrides, and suboxides of titanium, etc., through the use of the electrolytes and methods of GB 2168383A was demonstrated.

Although the electrolytes and methods of GB 2168383A represent a major advancement over prior art, these methods and electrolytes have certain shortcomings from a manufacturing standpoint. The polar, aprotic solvents of this patent are difficult to contain in anodizing tank plumbing systems. It is also very difficult to maintain the water content of the electrolytes of GB 2168383A below 2 wt. % while anodizing at 30° C. or below without air-tight anodizing tank covers, vacuum-treatment to reduce the electrolyte water content, etc. The anodized anodes must be carefully transferred from the anodizing tanks to rinse systems so as not to allow the electrolytes of GB 2168383A to drip onto floors, equipment, or personnel due to the aggressive solvent action of these electrolytes (the electrolytes present tend to attack flooring and machine finishes, as well as operator clothing).

There also exist technical/process disadvantages with the electrolytes/methods of GB 2168383A. The resistivity of the electrolytes of this patent tend to exhibit excessively high resistivities at the anodizing temperatures where these electrolytes have been found useful (i.e., below approximately 30° C.), generally in excess of 1,000 ohm-cm at 1 kHz. The rapid and thorough anodizing of powder metallurgy anodes fabricated from finely powdered valve metals and designed for low voltage applications, has been found to require electrolyte resistivities, at anodizing temperatures, of less than about 500 ohm-cm at 1 kHz, and preferably on the order of 250 ohm-cm or less.

The aproticity of the electrolyte solvents of GB 2168383A (necessary to minimize adverse reactions during anodizing of very reactive substrates, such as titanium metal) presents an additional problem in the anodizing of porous anodes fabricated from finely powdered materials. The orthophosphate ion tends to accumulate within the anode bodies due to electrostatic attraction, with the cations (assuming amine salts are used to obtain minimum electrolyte resistivity) accumulating near the cathode surfaces. The orthophosphate ions within the anode bodies react with the low water content of the electrolytes to form orthophosphoric acid. Orthophosphoric acid is poorly ionized in aprotic solvent solutions and, in consequence, the resistivity of the electrolyte within the anode bodies rises to high levels, resulting in incomplete internal oxide formation unless very long anodizing times are employed.

SUMMARY OF THE INVENTION

The invention is directed to a non-aqueous electrolytic solution comprising glycerine and at least one soluble salt formed by the neutralization of at least one non-halogen-containing organic or inorganic acid anion with at least one alkali metal, ammonium, or protonated amine cation. The acid anion is derived from an acid having a pKa lower than phosphoric acid. In particular, the invention is directed to a non-aqueous electrolytic solution comprising glycerine and ammonium nitrate.

The invention is further directed to a method of anodizing comprising anodizing an anode at a temperature of about 60° C. to about 125° C., particularly 80° C. to about 95° C., until a uniform anodic oxide film is formed over the entire anode surface with the non-aqueous electrolytic solution wherein the anode comprises a valve metal-derived nitride, sub-nitride, oxide, or sub-oxide, or an alloy thereof, a mixture thereof, or a metallic glass composition thereof.

The invention is also directed to a capacitor comprising an anode prepared from valve-metal derivative powder and a non-aqueous electrolytic solution comprising glycerine and at least one soluble salt formed by the neutralization of at least one non-halogen-containing organic or inorganic acid anion with at least one alkali metal, ammonium, or protonated amine cation; wherein the acid anion is derived from an acid having a pKa lower than phosphoric acid, and wherein the valve-metal derivative is a valve metal-derived nitride, sub-nitride, oxide, or sub-oxide, or an alloy thereof, a mixture thereof, or a metallic glass composition thereof.

DETAILED DESCRIPTION OF THE INVENTION

It was discovered that titanium-derived materials, such as titanium nitride, which contain additional elements, such as nitrogen or oxygen, serve to reduce the chemical potential driving oxygen diffusion from anodic oxide into a substrate, and tend to reduce the reactivity of the material during anodizing. The reduction in reactivity of titanium compounds, such as the nitride or suboxides, eliminates the need for anodizing electrolytes using polar, aprotic solvents. These materials cannot be anodized in aqueous solutions, but it was discovered that they can be anodized in polar, protic solvents, such as polyhydric alcohols, containing less than about 2% water.

It was further discovered that titanium-derived materials, such as titanium nitride, which have an enhanced resistance to oxygen migration from the anodic oxide film can be successfully anodized at temperatures above the approximately 30° C. upper limit of the method of GB 2168383A. More specifically, it was discovered that anodizing temperatures as high as those traditionally used for tantalum anodes (i.e., 80° C. to 90° C.) may be successfully employed. Synergistically, polyhydric alcohol-based anodizing electrolytes maintained at a temperature of 80° C. to 90° C. in contact with the atmosphere reach an equilibrium water content of approximately 1 wt. %, well within the range suitable for anodizing oxygen diffusion-resistant titanium-derived materials.

The suitability of various polyhydric alcohols for use in the electrolytes of the invention depends upon several factors, including thermal stability, dielectric constant, and boiling point (and associated evaporation rate). It was discovered that the polyhydric alcohol, glycerine (also known as "glycerol", "glycerin", "1,2,3-propane triol", etc.), is unique among the polyhydric alcohols in its suitability for use in the electrolytic solvent system of the invention.

Glycerine has excellent thermal stability in contact with air at temperatures of 80° C. to 90° C. Glycerine also has a relatively high dielectric constant of 42.5 at 25° C. and so gives rise to ionization of dissolved salts to yield conductive electrolyte solutions. Glycerine has a high boiling, 289° C., and a low vapor pressure at 80° C. to 90° C. so that minimal evaporation of the electrolyte occurs on standing in an anodizing tank at 90° C. In contrast, ethylene glycol, propylene glycol, 1,3-propane diol, 2-methyl-1,3-propane diol, and the butane diols, all have boiling points at or below 230° C. and have excessive evaporation rates at 80° C. to 90° C. Furthermore, several of the lower molecular weight diols, such as ethylene glycol, diethylene glycol, and hexalene glycol are moderately toxic materials and care must be taken to not expose workers to the liquids/vapors from these materials. Glycerine, in contrast, has a very low order of toxicity.

Glycerine is readily available from a number of suppliers, and, in bulk, at low cost. Synthetic glycerine is preferable to glycerine from natural (animal) sources as the latter tends to contain 100 ppm or more of protein-like materials which scorch to form dark deposits and which darken the electrolyte when used at 80° C. to 90° C.

Orthophosphate salts which are soluble in glycerine do not provide electrolyte solutions which are sufficiently conductive for efficient 80° C. to 90° C. anodizing of porous anodes having a fine pore structure. It was then discovered that orthophosphate salts are not necessary to provide a suitable electrolytic solution.

Electrolytes used to anodize valve metals, such as tantalum and niobium, containing only minimal amounts of an oxygen migration-suppressing element, such as nitrogen, generally contain phosphoric acid (orthophosphate ion) which is incorporated into the anodic oxide film during anodizing. The incorporated phosphate acts to suppress oxygen migration in anodic films. There appears to be little need for oxygen-incorporated phosphate for thermal stability with films formed on valve metal-derived substrates, such as tantalum nitride, niobium nitride, or titanium nitride, due to the presence of an ample amount of an oxygen migration-inhibiting element in the substrate prior to anodizing.

It was discovered that glycerine-soluble and thermally stable reaction products (salts) formed by replacing the ionizable hydrogen atoms in organic or inorganic, non-halogen-containing acids, stronger than phosphoric acid (i.e., pKa lower than that of phosphoric acid in glycerine), with alkali metal ions, ammonium ions, and/or protonated amine ions give good results as ionogens. Suitable ionogens include, but are not limited to, ammonium nitrate, dimethyl ethanolamine nitrate, dimethyl ethanolamine sulfate, dimethylethoxy ethanolamine nitrate, and dimethylethoxy ethanolamine sulfate. Among these ionogens, ammonium nitrate has particularly desirable properties. Ammonium nitrate is readily soluble in glycerine, and it is possible to prepare the solution containing in excess of 10 wt. % ammonium nitrate at room temperature by simply stirring the materials together.

The low pKa of nitric acid combined with the high solubility of the ammonium ion in polyhydric alcohols and the high equivalent conductance of both the ammonium and the nitrate ions gives rise to high electrical conductivity/low electrical resistivity for solutions of ammonium nitrate in glycerine. Below are comparative resistivities for glycerine solutions of ammonium nitrate and dibasic potassium phosphate at approximately 85° C.

| Concentration | $K_2HPO_4$ | $NH_4NO_3$ |
|---|---|---|
| 1 wt. % | 1950 | 840 |
| 2 wt. % | 1076 | 456 |
| 5 wt. % | 530 | 185 |
| 10 wt. % | 383 | 93 |

The much higher conductivity of the ammonium nitrate solutions is readily apparent.

It was discovered that an 85° C. to 90° C. solution of ammonium nitrate in glycerine containing approximately 1 wt. % water is capable of producing an anodic oxide film of a highly insulating nature on a titanium nitride substrate.

The present invention is thus directed to non-aqueous solutions of glycerine and at least one soluble salt formed by the neutralization of non-halogen-containing organic or inorganic acid anions with alkali metal, ammonium, and/or protonated amine cations. The acid anions are formed from acids having a lower pKa than phosphoric acid, such as but not limited to, nitric acid and sulfuric acid. Preferably, the soluble salt is ammonium nitrate.

By non-aqueous solutions, it is meant that the solution has less than 5 wt % water, preferably less than 2 wt % water and more preferably less than 1 wt % water.

The amount of soluble salt in the glycerine solution is about 0.5 to about 15 wt %, preferably about 5 to about 10 wt %, based on the total weight of the solution.

The glycerine solutions in accordance with the invention retain a greater portion of their conductivity within fine anode body pores and interstices of the anode than do glycerine solutions of phosphate salt analogues. Glycerine solutions of ammonium nitrate are unexpectedly stable with respect to thermal decomposition at 80° C. to 90° C. and tend to reach an equilibrium water content of approximately 0.5–1 wt. % at this temperature when exposed to the atmosphere. This combination of thermal stability and equilibrium water content make these solutions well suited for anodizing valve metals or valve metal-derived nitrides, sub-nitrides, or suboxides at 80° C. to about 90° C.

Anodizing electrolytic non-aqueous solutions produced with such glycerine solutions of salts described above are suitable for anodizing valve metals and valve metal-derived nitrides and suboxides. Suitable valve metal nitrides include, but are not limited to, titanium nitride, niobium nitride, and tantalum nitride. Suitable valve metal sub oxides, include, but are not limited to titanium suboxides.

The invention is directed to a method of anodizing an anode prepared from a valve metal-derived nitride, sub-nitride, oxide, sub-oxide, or an alloy thereof, a mixture thereof, or a metallic glass compositions thereof. The anodizing is conducted at a temperature of about 60° C. to about 125° C. until a uniform anodic oxide film is formed over the entire anode surface with the non-aqueous electrolytic solution. The thickness of the film is determined by the applied voltage.

Preferably the anodizing temperature is about 80 ° C. to about 95 ° C., more preferably about 84° C. to about 92° C.

The invention is further directed to preparing a capacitor by anodizing an anode prepared from a valve-metal derivative powder using the non-aqueous electrolytic solution. The valve-metal derivative powder is a valve metal-derived nitride, sub-nitride, oxide, or sub-oxide, or an alloy thereof, a mixture thereof, or a metallic glass composition thereof.

It should be understood that small modifications of the of the solvent and/or solute of the present invention can be made without departing from the spirit of this disclosure, e.g., it is anticipated that small amounts of orthophosphate (up to the solubility limit) can be added to the electrolyte to advantage and that small amounts of diols, such as propylene glycol, will not adversely effect the electrolytes of the present invention.

EXAMPLES

Example 1

A 0.14 gram anode body was pressed to near theoretical density from GFS titanium nitride powder and sintered at 1600° C. for 20 minutes, producing an almost solid slug having a very rough surface. The body was suspended by a tantalum riser wire in a 250 ml stainless steel beaker containing a solution of 15 grams of ammonium nitrate in 275 grams of glycerine (approximately 1% water content) at 80° C.–90° C.

A current of 20 milliamperes was applied until the voltage reached 20 volts (in about 11 minutes), then the current was allowed to "age down" overnight. After approximately 15½ hours at voltage, the current had decayed to 0.015 to 0.017 milliampere, an extremely low value considering the high impurity content of the starting material (over 500 ppm of carbon and iron).

This example demonstrates the ability to anodize titanium nitride at 80° C.–90° C. with ammonium nitrate in glycerine.

Example 2

In order to test the efficacy of the electrolyte of the invention when anodizing a traditional valve metal, a tantalum foil coupon having approximately 40 square centimeters of immersed surface area was anodized at 86° C. in a 5 wt. % solution of ammonium nitrate in glycerine (containing approximately 1% water). A current density of 1 milliampere per square centimeter was employed (40 milliamperes total current) giving a time to reach 100 volts of approximately 4 minutes, 20 seconds. The coupon then "aged down" normally. The current after 1 minute at voltage was 2.72 milliamperes, after 5 minutes at voltage was 1.10 milliamperes, after 31 minutes at voltage was 0.22 milliamperes, and after 40 minutes at voltage was 0.179 milliamperes.

This example demonstrates that the electrolyte of the invention is capable of anodizing a coupon of the traditional valve metal, tantalum, to a voltage level commonly used to form the anodic oxide in the manufacture of electrolytic capacitors.

Example 3

In order to determine the ability to anodize the deep recesses and interstices of relatively large capacitance, powder metallurgy anodes with the electrolyte of the invention, the following experiment was conducted: 8 anodes fabricated from Showa S-506 tantalum powder and exhibiting a capacitance of approximately 650 microfarads when anodized to 20 volts in dilute phosphoric acid at 80° C. were welded to an aluminum process bar and were suspended in a 5 wt. % solution of ammonium nitrate in glycerine (about 1% water content) contained in a small anodization tank maintained at a temperature of 84° C. to 92° C. A cathode screen standoff (i.e., the distance between the bottoms of the anodes and the top of the cathode screen) of slightly less than 1 centimeter was employed.

A current of 0.9 ampere (approximately 9 microamperes per microfarad-volt) was applied until the anodes reached 20 volts. The time required to reach 20 volts was approximately 15 minutes. The anodes were then held at voltage for an additional 6 hours, 10 minutes. The anodes were then rinsed in de-ionized water, dried at 85° C., and wet cell tested in 17 wt. % phosphoric acid to obtain capacitance and d.c. leakage current measurements. The results are below.

| Part Number | 120 Hz Capacitance (microfarads) | D.C.L. with 60 second charge (nanoamperes/microfarad-volt) |
| --- | --- | --- |
| 1 | 656.92 | 0.34 |
| 2 | 641.00 | 0.52 |
| 3 | 652.66 | 0.87 |
| 4 | 660.73 | 0.53 |
| 5 | 650.05 | 0.59 |
| 6 | 651.54 | 0.94 |
| 7 | 653.04 | 0.48 |
| 8 | 648.49 | 2.03 |
| Average | 651.80 | 0.788 |
| Std. Dev. | 5.84 | 0.541 |

The data indicates that all of the anodes are completely anodized; the capacitance standard deviation of 5.84 microfarads is very small for a capacitance target of 650 microfarads. The d.c.l. data also indicates that the oxide is of high quality with respect to leakage current in spite of the absence of orthophosphate ion.

In a comparative test, a bar of anodes of the same rating (i.e., 650 microfarads) was anodized to 20 volts in 10 wt. % dibasic potassium phosphate solution in glycerine at 90° C. After these anodes were held at voltage for a similar period of time (i.e., approximately 6 hours), they were found to be incompletely anodized on the inside. Fractured anodes were a different color in the center (signifying a different oxide thickness) than the external anode color. The results of this experiment indicate that the pKa of phosphoric acid is not low enough to give sufficient conductivity within the anode pores for the purposes of the process/electrolyte of the invention.

That the incomplete anodization of the interior portion of the anodes with the phosphate salt is due to the excessively high pKa of phosphoric acid and not due to the electrolyte resistivity (5% $NH_4NO_3$ in glycerine, resistivity=185 ohm-cm, 10% $K_2HPO_4$ in glycerine, resistivity=383 ohm-cm, both at 90° C.) is demonstrated by the fact that a solution of 10 wt. % potassium formate in glycerine has an even lower 90° C. resistivity (140 ohm-cm) than 5 wt. % ammonium nitrate in glycerine (185 ohm-cm) but when used to anodize the 650 microfarad anodes (20 volts) used for the test, an even greater fraction of the interior portion of the anodes is incompletely anodized than with the $K_2HPO_4$/glycerine electrolyte. This can only be explained by the still higher pKa of formic acid (than phosphoric acid) in glycerine.

Additionally, electrolytes of the invention, i.e., solutions of ammonium nitrate in glycerine, have an unanticipated high degree of thermal stability at the temperature range useful for the purposes of the process of the invention, that is, over the temperature range of about 60° C. to 125° C. and more particularly, from about 80° C. to 90° C. Even at 10 wt. % ammonium nitrate concentration, the electrolyte solutions are slow to discolor at 90° C. and maintain their original resistivity for at least 3 weeks at this temperature.

Example 4

A sample of 5 wt. % ammonium nitrate in glycerine was maintained at a temperature of 80° C. to 90° C. for 1 week in a stainless steel beaker, open to the atmosphere. During this period, various anodes and valve metal coupons were anodized in this electrolyte.

After 1 week at 80° C. to 90° C., a sample of the electrolyte solution was submitted for analysis. The results are given below.

| | |
|---|---|
| Water Content = | 0.895% |
| (determined by Karl Fisher Analysis) | |
| Chromium = | 0.08 ppm |
| Iron = | 0.60 ppm |
| Nickel = | 0.17 ppm |
| (above determined by ICP analysis) | |

A second sample of 5 wt. % ammonium nitrate in glycerine was maintained at a temperature of 80° C. to 90° C. for 6 weeks in a small anodizing tank, open to the atmosphere. During this period, various anodes and valve metal coupons were anodized in this electrolyte.

After 6 weeks at 80° C. to 90° C., a sample of the electrolyte solution was submitted for analysis. The results are given below.

| | |
|---|---|
| Water Content = | 0.715% |
| (determined by Karl Fisher Analysis) | |
| Chromium = | 0.07 ppm |
| Iron = | 0.51 ppm |
| Nickel = | 0.17 ppm |
| (above determined by ICP analysis) | |

The electrolyte solutions of ammonium nitrate in glycerine are very stable at 80° C. to 90° C. with respect to thermal decomposition and change in resistivity, and do not give rise to corrosive byproducts which attack stainless steel.

Glycerine solutions of ammonium nitrate (10%) decompose smoothly to gases, leaving little ash or char when heated to several hundred degrees C on glass slides on a hotplate. There was no evidence of violent reaction during this testing.

By contrast, solutions of ammonium nitrate (5% to 10%) in other polar, high boiling point solvents, such as polyethylene glycol, polyethylene glycol monomethyl ether, or polyethylene glycol dimethyl ether, decomposes rapidly at 80° C. to 900 C., giving rise to dark red-brown solutions of unknown chemistry after only 1 to 2 hours at this temperature range.

What is claimed is:

1. A non-aqueous electrolytic solution comprising a non-aqueous solution of glycerine and at least one soluble salt formed by the neutralization of at least one non-halogen-containing organic or inorganic acid anion with at least one alkali metal, ammonium, or protonated amine cation; wherein the acid anion is derived from an acid having a pKa lower than phosphoric acid; wherein the solution contains less than 2 wt % water, based on total weight of solution, and wherein the non-aqueous solution is suitable for anodizing valve metal or valve metal-derived anodes.

2. The non-aqueous electrolytic solution according to claim 1 wherein the soluble salt is ammonium nitrate, dimethyl ethanolamine nitrate, dimethyl ethanolamine sulfate, dimethylethoxy ethanolamine nitrate, or dimethylethoxy ethanolamine sulfate.

3. The non-aqueous electrolytic solution according to claim 2 wherein the soluble salt is ammonium nitrate.

4. The non-aqueous electrolytic solution according to claim 1 wherein the solution contains less than 1 wt % water, based on total weight of solution.

5. The non-aqueous electrolytic solution according to claim 1 comprising about 0.5 wt % to about 15 wt % of the soluble salt, based on total weight of the solution.

6. The non-aqueous electrolytic solution according to claim 5 comprising about 5 wt % to about 10 wt % of the soluble salt, based on total weight of the solution.

7. A non-aqueous electrolytic solution comprising a non-aqueous solution of glycerine and ammonium nitrate; wherein the solution contains less than 2 wt % water, based on total weight of solution, and wherein the non-aqueous solution is suitable for anodizing valve metal or valve metal-derived anodes.

* * * * *